United States Patent
Loper et al.

[19]

[11] Patent Number: 5,805,907
[45] Date of Patent: Sep. 8, 1998

[54] SYSTEM AND METHOD FOR REDUCING POWER CONSUMPTION IN AN ELECTRONIC CIRCUIT

[75] Inventors: Albert John Loper, Cedar Park; Soummya Mallick, Austin, both of Tex.

[73] Assignee: International Business Machines Corporation, Armonk, N.Y.

[21] Appl. No.: 726,370

[22] Filed: Oct. 4, 1996

[51] Int. Cl.$^6$ .................................................. G06F 1/32
[52] U.S. Cl. .................. 395/750.01; 395/750.03
[58] Field of Search .................... 395/750.01, 750.03, 395/750.04, 750.05, 750.06

[56] References Cited

U.S. PATENT DOCUMENTS

| | | |
|---|---|---|
| 5,345,569 | 9/1994 | Tran . |
| 5,420,808 | 5/1995 | Alexander et al. ...................... 364/707 |
| 5,452,401 | 9/1995 | Lin ...................................... 395/750.04 |
| 5,465,373 | 11/1995 | Kable et al. ............................ 395/391 |
| 5,491,829 | 2/1996 | Kau et al. . |
| 5,494,419 | 2/1996 | Rostoker et al. . |

FOREIGN PATENT DOCUMENTS

| | | |
|---|---|---|
| 167853 | 1/1986 | European Pat. Off. . |
| WO9516952 | 6/1995 | WIPO . |
| WO9518998 | 7/1995 | WIPO . |
| WO9534070 | 12/1995 | WIPO . |

OTHER PUBLICATIONS

*IBM Technical Disclosure Bulletin*, vol. 37, No. 04A, Apr. 1994, pp. 51–52, "Bus Load Reduction in Disk Array Controller through the Use of Multicast Busing Techniques".

*IBM Technical Disclosure Bulletin*, vol. 37, No. 04B, Apr. 1994, pp. 73–74, "Externally Triggered Soft Stop for Microprocessors".

*IBM Technical Disclosure Bulletin*, vol. 37, No. 04B, Apr. 1994, pp. 385–388, "RISC Superscalar Pipeline Out–of–Order Statistics Gathering and Analysis".

*IBM Technical Disclosure Bulletin*, vol. 37, No. 09, Sep. 1994, pp. 283–284, "Clock–Controlled Power Save Method".

*IBM Technical Disclosure Bulletin*, vol. 37, No. 10, Oct., 1994, pp. 59–60, "Special Serialization for Load–with–Update" Instruction to Reduce the Complexity of Register Renaming Circuitry.

*IBM Technical Disclosure Bulletin*, vol. 37, No. 10, Oct. 1994, pp. 151–153, "Minimizing Power Consumption in Micro–Processor Based Systems which Utilize Speech Recognition Devices".

*IBM Technical Disclosure Bulletin*, vol. 38 No. 12, Dec. 1995, pp. 443–444, "Digital Adjustable Linear Regulator".

*Primary Examiner*—Ayaz R. Sheikh
*Assistant Examiner*—Ario Etienne
*Attorney, Agent, or Firm*—Michael A. Davis, Jr.; Casimer K. Salys

[57] ABSTRACT

While dispatch circuitry operates in a first power mode, per cycle of the dispatch circuitry, up to N number of instructions are dispatched to execution circuitry for execution, where N is an integer number and N>1. While the dispatch circuitry operates in a second power mode, per cycle of the dispatch circuitry, up to M number of instructions are dispatched to the execution circuitry for execution, where M is an integer number and 0<M<N.

12 Claims, 5 Drawing Sheets

| BUFFER NUMBER | INSTRUCTION TYPE / EXECUTION UNIT | #GPR DEST. | #FPR DEST. | FINISHED | EXCEPTION |
|---|---|---|---|---|---|
| 0 | | | | | |
| 1 | 22 | 1 | 0 | 0 | 0 |
| 2 | 22 | 1 | 0 | 0 | 0 |
| 3 | | | | | |
| 4 | | | | | |

175 COMPLETION →
ALLOCATION →
173

76

| BUFFER NUMBER | REGISTER NUMBER | INFORMATION |
|---|---|---|
| 0 | | |
| 1 | | |
| 2 | | |
| 3 | | |

182 WRITE-BACK
184 COMPLETION
180 ALLOCATION
38

SYSTEM AND METHOD FOR REDUCING POWER CONSUMPTION IN AN ELECTRONIC CIRCUIT

CROSS-REFERENCES TO RELATED APPLICATIONS

This patent application is related to copending U.S. patent application Ser. No. 08/726,871, filed Oct. 4, 1996; Ser. No. 08/726,396, filed Oct. 4, 1996; and Ser. No. 08/726,395 filed Oct. 4, 1996, each filed concurrently herewith.

TECHNICAL FIELD

This patent application relates in general to electronic circuitry and in particular to a method and system for reducing power consumption in an electronic circuit.

BACKGROUND

In recent years, portable laptop computers have become increasingly popular. Frequently, such laptop computers are battery powered in order to enhance their portability. Preferably, a battery powered laptop computer operates for an extended period of time under battery power before its battery is either recharged or replaced.

Accordingly, it is important to reduce power consumption within an electronic circuit of the laptop computer, in order to extend the period of time during which the electronic circuit operates before recharging or replacing the battery. For this purpose, some previous techniques disable power or disable clock signals to the electronic circuit in response to a specified time elapsing without sensing a particular type of activity. A shortcoming of such previous "timer" techniques is that the electronic circuit can unnecessarily consume excess power while waiting for the timer to expire, even when the electronic circuit is not performing an operation.

Thus, a need has arisen for a method and system in which an electronic circuit consumes less excess power relative to previous techniques.

SUMMARY

While dispatch circuitry operates in a first power mode, per cycle of the dispatch circuitry, up to N number of instructions are dispatched to execution circuitry for execution, where N is an integer number and N>1. While the dispatch circuitry operates in a second power mode, per cycle of the dispatch circuitry, up to M number of instructions are dispatched to the execution circuitry for execution, where M is an integer number and 0<M<N.

It is a technical advantage that an electronic circuit consumes less excess power relative to previous techniques.

BRIEF DESCRIPTION OF THE DRAWINGS

An illustrative embodiment and its advantages are better understood by referring to the following descriptions and accompanying drawings, in which.

DETAILED DESCRIPTION

An illustrative embodiment and its advantages are better understood by referring to FIGS. 1–7 of the drawings.

Figure 1:
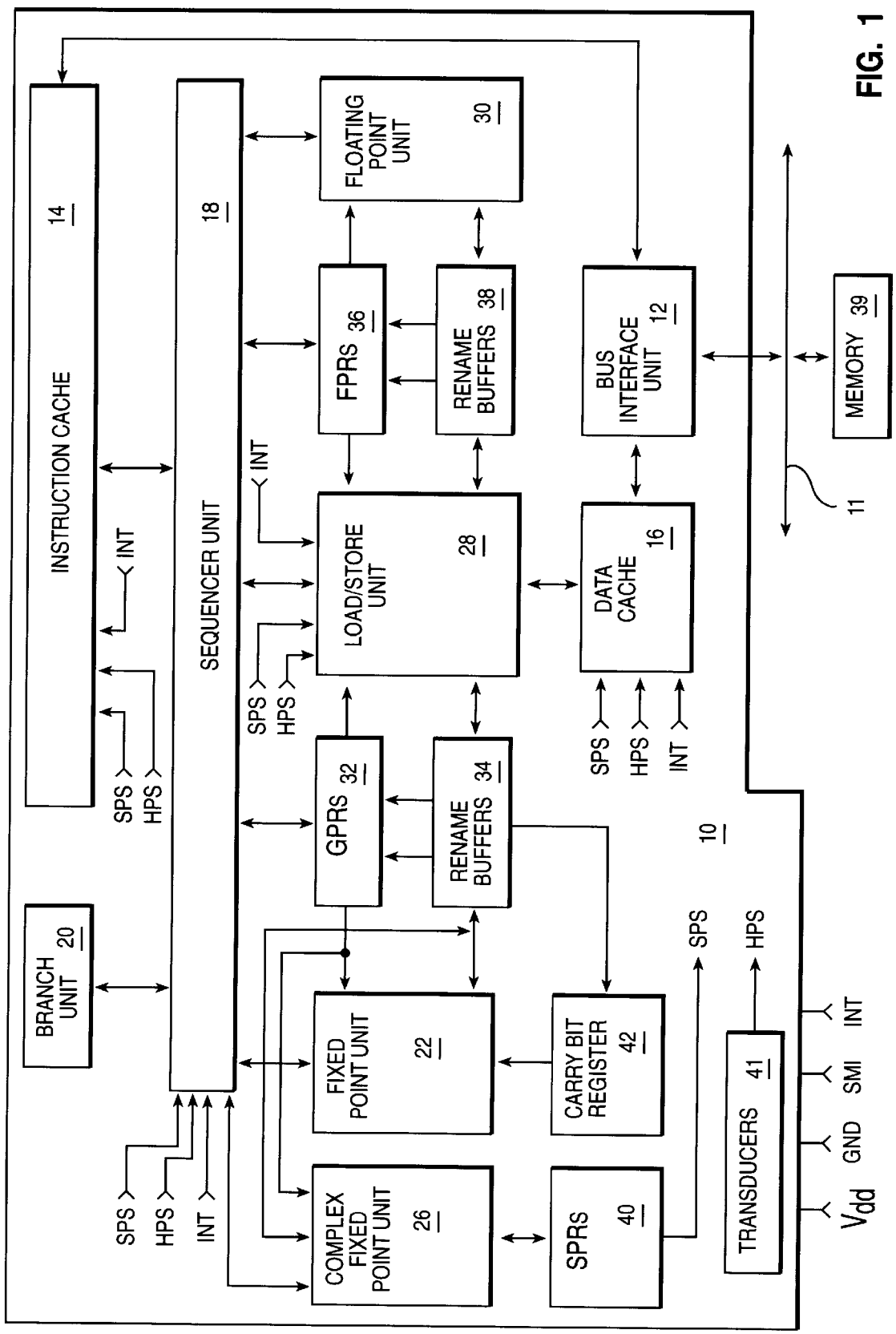
FIG. 1 is a block diagram of a processor system for processing information according to the illustrative embodiment.

FIG. 1 is a block diagram of a processor 10 system for processing information according to the illustrative embodiment. In the illustrative embodiment, processor 10 is a single integrated circuit superscalar microprocessor. Accordingly, as discussed further hereinbelow, processor 10 includes various units, registers, buffers, memories, and other sections, all of which are formed by integrated circuitry. Also, in the illustrative embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the illustrative embodiment the execution circuitry of processor 10 includes multiple execution units, namely a branch unit 20, a fixed point unit ("FXU") 22, a complex fixed point unit ("CFXU") 26, a load/store unit ("LSU") 28 and a floating point unit ("FPU") 30. FXU 22, CFXU 26 and LSU 28 input their source operand information from general purpose architectural registers ("GPRs") 32 and fixed point rename buffers 34. Moreover, FXU 22 inputs a "carry bit" from a carry bit ("CA") register 42. FXU 22, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 26, 28 and 30. Each execution unit executes one or more instructions of a particular class of instructions. For example, FXU 22 executes a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 26, 28 and 30. Accordingly, each instruction is processed as a sequence of stages, each being executable in parallel with stages of other instructions. Such a technique is called "pipelining". In the illustrative embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to two fetched instructions.

In the dispatch stage, sequencer unit 18 selectively dispatches up to two decoded instructions to selected (in response to the decoding in the decode stage) ones of execution units 20, 22, 26, 28 and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

Processor 10 implements, and operates according to, five power modes. Four of these five power modes are "power saving" modes of operation. The five power modes are selectively enabled and disabled in response to states of control bits in a machine state register ("MSR") and hardware implementation register. These registers are located in SPRs 40. Accordingly, the control bits are set and/or cleared in response to CFXU 26 executing move instructions directed to SPRs 40. The five power modes are Full-power, Doze, Nap, Sleep, and, in a significant aspect of the illustrative embodiment, Special.

1. Full-power mode. The Full-power mode is the default power mode of processor 10. In the Full-power mode, processor 10 is fully powered, and units operate at the processor clock speed of processor 10. Processor 10 further implements a dynamic power management mode which can be selectively enabled and disabled. If the dynamic power management mode is enabled, then idle units within processor 10 automatically enter a low-power state without affecting performance, software execution, or external hardware circuitry.

The aforementioned dynamic power management mode, and the Full-power, Doze, Nap, and Sleep power modes, are more completely described in the publication entitled *PowerPC 603e RISC Microprocessor User's Manual,* published by IBM Microelectronics Division, Hopewell Junction, N.Y., Telephone 1-800-PowerPC, which is hereby fully incorporated by reference herein. Moreover, the dynamic power management mode is described in U.S. Pat. No. 5,420,808, which is hereby fully incorporated by reference herein. In the illustrative embodiment, processor 10 is an enhanced version of the PowerPC 603e RISC microprocessor available from IBM Microelectronics Division, Hopewell Junction, N.Y. Processor 10 is enhanced relative to the PowerPC 603e RISC microprocessor, as processor 10 implements the Special power mode. Accordingly, the Special power mode is a significant aspect of the illustrative embodiment.

2. Doze mode. In the Doze mode, all units of processor 10 are disabled except bus snooping logic of BIU 12, time base/decrementer registers (not shown in FIG. 1) of processor 10, and a phase-locked loop ("PLL") (not shown in FIG. 1) of processor 10. In the Doze mode, the PLL of processor 10 continues in a fully powered state and remains synchronized to an external system clock of system bus 11, so that any return to the Full-power mode occurs within only a few clock cycles of processor 10.

From the Doze mode, processor 10 returns to the Full-power mode in response to an external asynchronous interrupt via assertion of an interrupt line INT, so that INT provides a signal having a logic 1 state to processor 10. Likewise, from the Doze mode, processor 10 returns to the Full-power mode in response to a system management interrupt via assertion of a system management interrupt line SMI, so that SMI provides a signal having a logic 1 state to processor 10. Moreover, from the Doze mode, processor 10 returns to the Full-power mode in response to a decrementer exception, a hard or soft reset, or a machine check input.

A hard reset occurs in response to a voltage supply node Vdd switching from a low voltage (e.g. 0 volts) to a predetermined voltage (e.g. 2.5 volts) relative to a voltage reference node GND. Notably, for clarity, FIGS. 1–6 show less than all connections from INT, SMI, Vdd, and GND to various circuitry throughout processor 10. From any power saving mode, processor 10 returns to the Full-power mode in response to a soft reset, in which control bits are set and/or cleared in response to CFXU 26 executing suitable move instructions directed to SPRs 40, where such move instructions are part of a software reset sequence of instructions.

3. Nap mode. Relative to the Doze mode, the Nap mode further reduces power consumption of processor 10 by disabling bus snooping logic of BIU 12, so that only the PLL and time base/decrementer registers of processor 10 remain in the full-power state. From the Nap mode, processor 10 returns to the Full-power mode in response to an external asynchronous interrupt via assertion of interrupt line INT, a system management interrupt, a decrementer exception, a hard or soft reset, or a machine check input. As with the Doze mode, any return from the Nap mode to the Full-power mode occurs within only a few clock cycles of processor 10.

4. Sleep mode. In the Sleep mode, power consumption is reduced to near minimum by disabling all units of processor 10, after which logic external to processor 10 can disable the PLL and the external system clock. From the Sleep mode, processor 10 returns to the Full-power mode in response to a reenabling of both the PLL and the external system clock, followed by a suitable minimum time elapsing for PLL to become synchronized to the external system clock, and then followed by assertion of interrupt line INT, a system management interrupt, a decrementer exception, a hard or soft reset, or a machine check input.

5. Special mode. In a significant aspect of the illustrative embodiment, processor 10 enters the Special mode in response to either (1) a hardware event or (2) a software event. In the illustrative embodiment, the hardware event occurs when transducers 41 output a signal having a logic 1 state on a line HPS (Hardware event, Power saving, Special mode). Similarly, the software event occurs when SPRs 40 output a signal having a logic 1 state on a line SPS (Software event, Power saving, Special mode). SPRs 40 output such a signal on SPS in response to CFXU 26 executing a suitable "Move to Special Purpose Register" ("MTSPR") instruction directed to a predetermined bit of a "HID0" register of SPRs 40.

Transducers 41 include thermal sensors for sensing a relative temperature of integrated circuitry which forms processor 10. The hardware event occurs (i.e. transducers 41 output a signal having a logic 1 state on HPS) in response to the thermal sensors (of trandsducers 41) sensing a relative temperature that exceeds a threshold temperature. In the illustrative embodiment, the threshold temperature is preselected to be a maximum safe temperature of processor 10 operating in the Full-power mode. Accordingly, if the temperature of processor 10 were to exceed the maximum safe temperature of processor 10 operating in the Full-power mode, then damage to processor 10 would likely result from continued operation of processor 10 in the Full-power mode. Advantageously, such damage is substantially avoided by processor 10 entering the Special "power saving" mode of operation in response to the hardware event.

If processor 10 enters the Special mode in response to the hardware event, processor 10 reduces the maximum number of instructions fetched during a single cycle of processor 10, so that fewer instructions are dispatched per cycle of processor 10 as discussed further hereinbelow in connection with FIGS. 2 and 3. In this manner, execution units are more likely to be idle, and consequently the low-power state of the dynamic power management mode (described in U.S. Pat. No. 5,420,808) advantageously is more readily invoked. Moreover, if processor 10 enters the Special mode in response to the hardware event, processor 10 changes the operation of LSU 28 as discussed further hereinbelow in connection with FIG. 5.

By comparison, if processor 10 enters the Special mode in response to the software event, processor 10 (a) reduces the maximum number of instructions fetched during a single cycle of processor 10 as discussed further hereinbelow in connection with FIGS. 2 and 3, (b) changes the operation of LSU 28 as discussed further hereinbelow in connection with FIG. 5. and (c) reduces power consumption within instruction cache 14 and data cache 16 by reducing their number of "ways" as discussed further hereinbelow in connection with FIG. 6.

From the Special mode, processor 10 returns to the Full-power mode in response to neither SPS nor HPS having a logic 1 state. Moreover, if processor 10 entered the Special mode in response only to the software event (i.e. SPS has a logic 1 state while HPS has a logic 0 state), then processor 10 further returns to the Full-power mode (from the Special mode) in response to (1) an external asynchronous interrupt via assertion of INT, or (2) a hard or soft reset, or (3) a machine check input. In an alternative embodiment, if processor 10 entered the Special mode in response only to the software event, processor 10 further returns to the Full-power mode (from the Special mode) in response to a system management interrupt via assertion of SMI. In such an alternative embodiment, processor 10 would return to the Full-power mode in response to assertion of SMI, analogously to the manner in which processor 10 returns to the Full-power mode in response to assertion of INT.

In yet another alternative embodiment, processor 10 also returns to the Full-power mode in response to a decrementer exception. SPRs 40 include circuitry for decrementing a count in response to a processor clock signal (not shown in FIG. 1 for clarity). A decrementer exception is generated in response to such a count being decremented to a value of zero.

FIG. 1 shows the single SPS line connected to each of instruction cache 14, data cache 16, sequencer unit 18 and LSU 28. Likewise, FIG. 1 shows the single HPS line connected to each of instruction cache 14, data cache 16, sequencer unit 18 and LSU 28. Similarly, FIG. 1 shows the single INT line connected to each of instruction cache 14, data cache 16, sequencer unit 18 and LSU 28.

Figure 2:
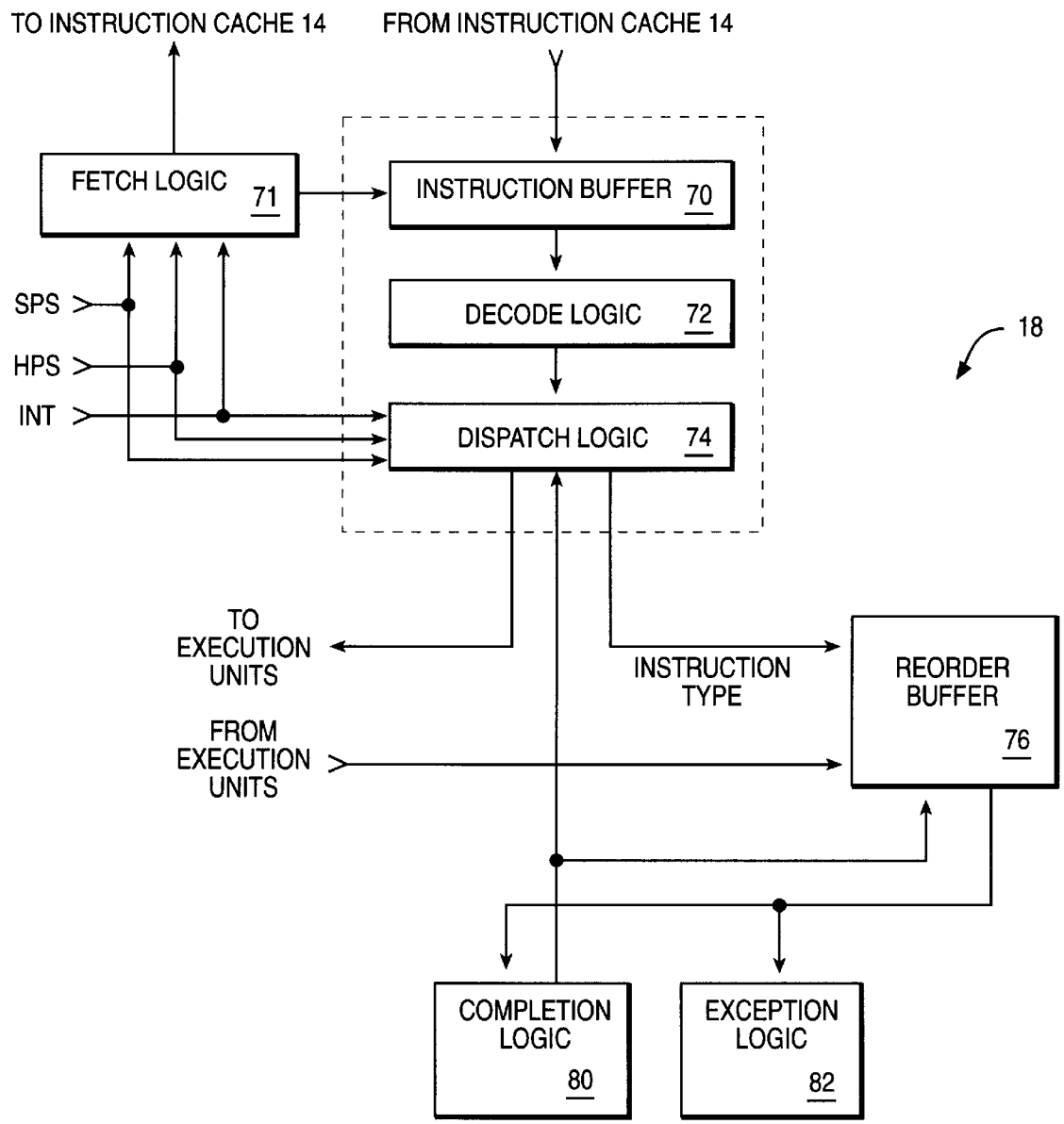
FIG. 2 is a block diagram of a sequencer unit of the processor of FIG. 1.

FIG. 2 is a block diagram of sequencer unit 18. As discussed hereinabove, in the fetch stage, if processor 10 (and hence also fetch logic 71) is operating in the Full-power mode, then fetch logic 71 selectively requests up to a maximum number of two instructions (per cycle of processor 10 and hence also of fetch logic 71) from instruction cache 14 and stores such instructions in an instruction buffer 70. Accordingly, during a particular cycle of processor 10, sequencer 18 requests a variable number (ranging from 0 to 2) of instructions from instruction cache 14, where the variable number depends upon the number of additional instructions able to be stored in instruction buffer 70 (i.e. depends upon the number of available buffers in instruction buffer 70).

In the decode stage, if processor 10 (and hence also decode logic 72) is operating in the Full-power mode, then decode logic 72 selectively inputs and decodes up to a maximum number of two fetched instructions (per cycle of processor 10 and hence also of decode logic 72) from instruction buffer 70. Accordingly, during a particular cycle of processor 10, decode logic 72 inputs and decodes a variable number (ranging from 0 to 2) of instructions from instruction buffer 70, where the variable number depends upon the number of instructions to be dispatched by dispatch logic 74 during the particular cycle.

In the dispatch stage, if processor 10 (and hence also dispatch logic 74) is operating in the Full-power mode, then dispatch logic 74 selectively dispatches up dispatches up to a maximum number of two decoded instructions (per cycle of processor 10 and hence also of dispatch logic 74) to selected (in response to the decoding in the decode stage) ones of execution units 20, 22, 26, 28 and 30. Accordingly, during a particular cycle of processor 10, dispatch logic 74 dispatches a variable number (ranging from 0 to 2) of decoded instructions to the execution units, where the variable number depends upon the number of additional instructions able to be stored in the execution units for execution (e.g. depends upon the number of available reservation stations in the execution units).

By comparison, in the illustrative embodiment, if processor 10 is operating in the Special power mode, then fetch logic 71 (in response to logic states of SPS, MPS and INT) requests a maximum of one instruction per cycle of processor 10 (instead of two instructions) from instruction cache 14 and stores the one instruction in instruction buffer 70. In this manner, (a) decode logic 72 inputs and decodes (on average) approximately one fetched instructions from instruction buffer 70 per cycle of processor 10, (b) dispatch logic 74 dispatches (on average) approximately one instruction (per cycle of processor 10) to a selected one of execution units 20, 22, 26, 28 and 30, and (c) completion logic 80 indicates (on average) "completion" (as discussed further hereinbelow) of approximately one instruction per cycle of processor 10. Accordingly, the execution units are more likely to be idle (relative to the Full-power mode), and consequently the low-power state of the dynamic power management mode (described in U.S. Pat. No. 5,420,808) advantageously is more readily invoked.

In an alternative embodiment, if processor 10 is operating in the Special power mode, then dispatch logic 74 (in response to logic states of SPS, MPS and INT) dispatches a maximum of one instruction per cycle of processor 10 (instead of two instructions) to a selected one of execution units 20, 22, 26, 28 and 30; this technique of the alternative embodiment is instead of (but can also be in addition to) the illustrative embodiment's technique of reducing the maximum number of instructions fetched during a single cycle of processor 10. Hence, FIG. 2 shows SPS, HPS and INT connected to both fetch logic 71 and dispatch logic 74.

Figure 3:
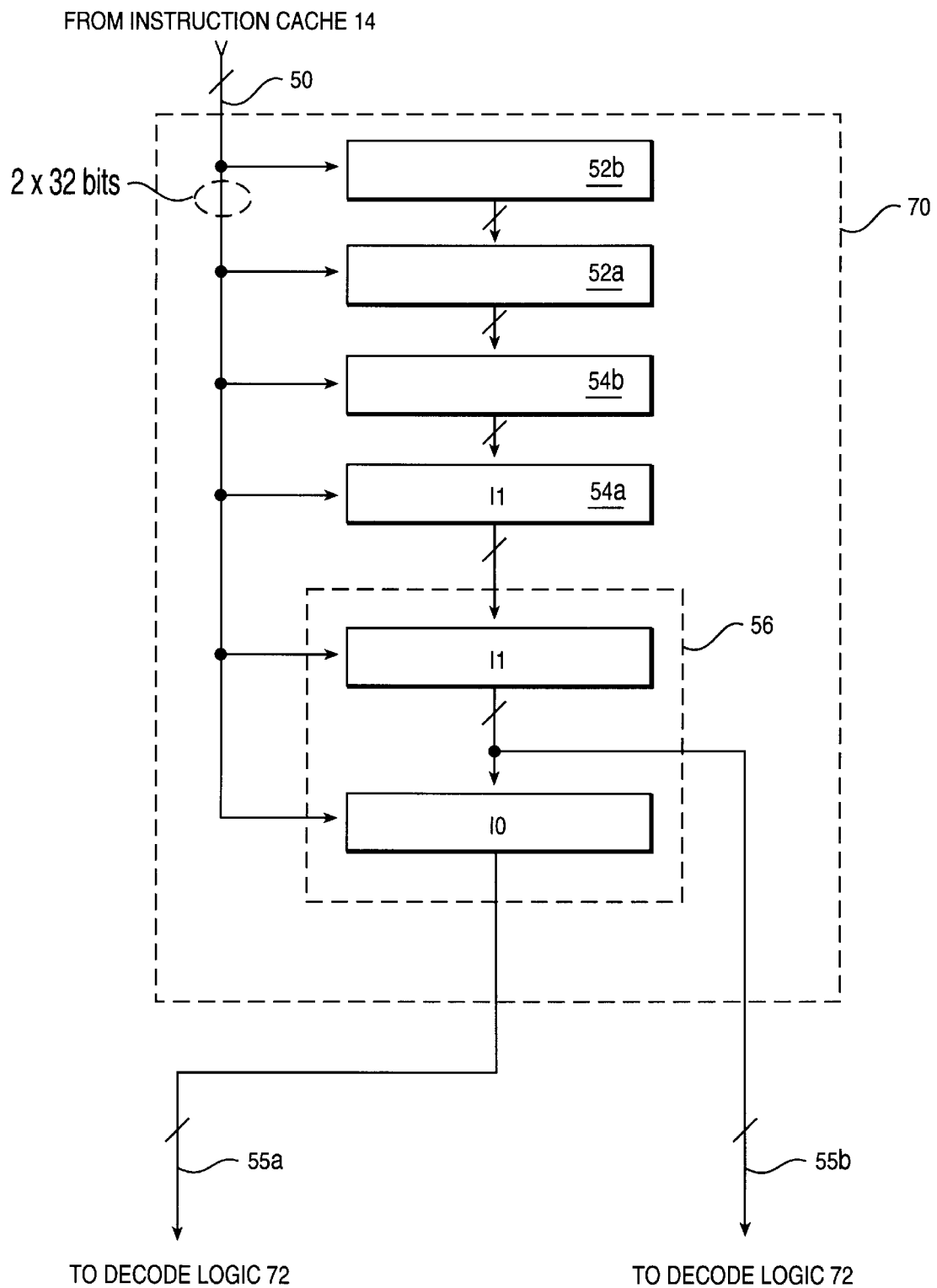
FIG. 3 is a block diagram of an instruction buffer queue of the sequencer unit of FIG. 2.

FIG. 3 is a block diagram of instruction buffer 70. Instruction buffer 70 stores an I0 instruction and an I1 instruction in a buffer I0 and a buffer I1, respectively, of dispatch buffers 56. In the illustrative embodiment, in response to a cycle of processor 10, either the I0 instruction is dispatched by itself to decode logic 72 (FIG. 2), both the I0 and I1 instructions are dispatched together to decode logic 72, or the I1 instruction is dispatched by itself to decode logic 72. The contents of buffers I0 and I1 are output to decode logic 72 through lines 55a–b, respectively.

In the illustrative embodiment, instruction buffer 70 is able to input up to two 32-bit instructions in parallel from instruction cache 14 through 64-bit bus 50 during a single cycle of processor 10. In response to both the I0 and I1 instructions being dispatched together to decode logic 72, instruction buffer 70 transfers any previously stored instructions from instruction buffers 54a–b to buffers I0 and I1, respectively. Also, in such a situation, instruction buffer 70 transfers any previously stored instructions from instruction buffers 52a–b to instruction buffers 54a–b, respectively. Moreover, in such a situation, if processor 10 is operating in the Full-power mode, instruction buffer 70 inputs up to two 32-bit instructions from instruction cache 14 through 64-bit bus 50 and stores such instructions in the first available (i.e. empty, not already storing an instruction) pair of buffers, i.e. either in (a) buffers I0 and I1, (b) 54b and 54a, or (c) 52b and 52a, beginning with buffer I0.

In response to the I0 instruction being dispatched by itself to decode logic 72, instruction buffer 70 transfers any previously stored instruction from buffer I1 to buffer I0. Also, in such a situation, instruction buffer 70 transfers any previously stored instructions from instruction buffer 54a to buffer I1, from instruction buffer 54b to instruction buffer 54a, from instruction buffer 52a to instruction buffer 54b, and from instruction buffer 52b to instruction buffer 52a. Moreover, in such a situation, instruction buffer 70 inputs a single 32-bit instruction from instruction cache 14 through 64-bit bus 50 and stores this instruction in the first available buffer, i.e. either in buffer I0, I1, 54b, 54a, 52b or 52a, beginning with buffer I0.

If processor 10 is operating in the Full-power mode, then instruction buffer 70 is able to input up to two 32-bit instructions in parallel from instruction cache 14 through 64-bit bus 50 during a single cycle of processor 10. In this manner, as an example, since instruction cache 14 is a four-way set-associative cache, at least 256 sense amplifiers (64 bits/way×4 ways×1 sense amplifier/bit) of instruction cache 14 are active during such a single cycle of processor 10. Activation of these sense amplifiers contributes to the average power consumption of processor 10.

By comparison, if processor 10 is operating in the Special power mode, then instruction buffer 70 is able to input a single 32-bit instruction from instruction cache 14 through 64-bit bus 50 during a single cycle of processor 10. In this manner, as an example, 128 sense amplifiers (32 bits/way×4 ways×1 sense amplifier/bit) of instruction cache 14 are active during each cycle of processor 10 (while the other 128 sense amplifiers of instruction cache 14 are disabled). Advantageously, by activating only 128 sense amplifiers (in the Special mode) instead of 256 sense amplifiers (in the Full-power mode), the average power consumption of processor 10 is reduced, because only ½ as many of these sense amplifiers are activated per cycle of processor 10.

Additional reductions are achieved if processor 10 enters the Special "power saving" mode in response to the software event, because in that situation processor 10 reduces the number of "ways" within instruction cache 14 and data cache 16 as discussed further hereinbelow in connection with FIG. 6. For example, if processor 10 reduces the number of "ways" within instruction cache 14 to two-way instead of four-way in response to the software event, then 64 sense amplifiers (32 bits/way×2 ways×1 sense amplifier/bit) of instruction cache 14 are active (while the other 192 sense amplifiers of instruction cache 14 are disabled) during each of the aforementioned two cycles of processor 10 while processor 10 is operating in the Special power mode. Advantageously, by activating only 64 sense amplifiers (if processor 10 enters the Special "power saving" mode in response to the software event) instead of 256 sense amplifiers (in the Full-power mode), the average power consumption of processor 10 is reduced, because only ¼ as many of these sense amplifiers are activated per cycle of processor 10.

Figures 4, 5, 7:
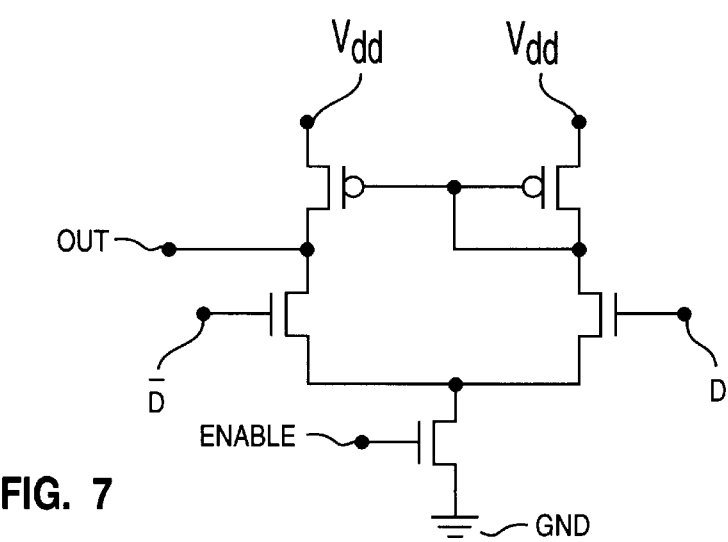
FIG. 4 is a conceptual illustration of a reorder buffer of the sequencer unit of FIG. 2.
FIG. 5 is a conceptual illustration of rename buffers of the processor of FIG. 1.
FIG. 7 is a schematic electrical circuit diagram of sense amplification circuitry of the instruction cache of FIG. 6.

FIG. 4 is a conceptual illustration of a reorder buffer 76 of sequencer unit 18 of the illustrative embodiment. As shown in FIG. 4, reorder buffer 76 has five entries respectively labelled as buffer numbers 0–4. Each entry has five primary fields, namely an "instruction type" field, a "number-of-GPR destinations" field, a "number-of-FPR destinations" field, a "finished" field, and an "exception" field.

Referring also to FIG. 2, as dispatch logic 74 dispatches an instruction to an execution unit, sequencer unit 18 assigns the dispatched instruction to an associated entry in reorder buffer 76. Sequencer unit 18 assigns (or "associates") entries in reorder buffer 76 to dispatched instructions on a first-in first-out basis and in a rotating manner, such that sequencer unit 18 assigns entry 0, followed sequentially by entries 1–4, and then entry 0 again. As the dispatched instruction is assigned an associated entry in reorder buffer 76, dispatch logic 74 outputs information concerning the dispatched instruction for storage in the various fields and subfields of the associated entry in reorder buffer 76.

For example, in entry 1 of FIG. 4, reorder buffer 76 indicates the instruction is dispatched to FXU 22. In other aspects of the illustrative embodiment, entry 1 further indicates the dispatched instruction has one GPR destination register (such that "number-of-GPR destinations"=1), has zero FPR destination registers (such that "number-of-FPR destinations"=0), is not yet finished (such that "finished"=0), and has not yet caused an exception (such that "exception"=0).

As an execution unit executes a dispatched instruction, the execution unit modifies the instruction's associated entry in reorder buffer 76. More particularly, in response to finishing execution of the dispatched instruction, the execution unit modifies the entry's "finished" field (such that "finished"=1). If the execution unit encounters an exception during execution of the dispatched instruction, the execution unit modifies the entry's "exception" field (such that "exception"=1).

FIG. 4 shows an allocation pointer 173 and a completion pointer 175. Processor 10 maintains such pointers for controlling reading from and writing to reorder buffer 76. Processor 10 maintains allocation pointer 173 to indicate whether a reorder buffer entry is allocated to (or "associated with") a particular instruction. As shown in FIG. 4, allocation pointer 173 points to reorder buffer entry 3, thereby indicating that reorder buffer entry 3 is the next reorder buffer entry available for allocation to an instruction.

Also, processor 10 maintains completion pointer 175 to indicate (for a reorder buffer entry previously allocated to a particular instruction) whether the particular instruction satisfies the following conditions:

Condition 1—The execution unit (to which the instruction is dispatched) finishes execution of the instruction;

Condition 2—No exceptions were encountered in connection with any stage of processing the instruction; and Condition 3—Any previously dispatched instruction satisfies Condition 1 and Condition 2.

As shown in FIG. 4, completion pointer 175 points to reorder buffer entry 1, thereby indicating that reorder buffer entry 1 is the next reorder buffer entry capable of satisfying Conditions 1, 2 and 3. Accordingly, "valid" reorder buffer entries can be defined as the reorder buffer entry pointed to by completion pointer 175 and its subsequent reorder buffer entries that precede the reorder buffer entry pointed to by allocation pointer 173.

Referring again to FIG. 2, the entries of reorder buffer 76 are read by completion logic 80 and exception logic 82 of sequencer unit 18. In response to the "exception" fields of reorder buffer 76, exception logic 82 handles exceptions encountered during execution of dispatched instructions. In response to the "finished" fields and "exception" fields of reorder buffer 76, completion logic 80 outputs signals to dispatch logic 74 and to reorder buffer 76. Through these signals, completion logic 80 indicates "completion" of instructions in order of their programmed sequence. Completion logic 80 indicates "completion" of an instruction if it satisfies the following conditions:

Condition 1—The execution unit (to which the instruction is dispatched) finishes execution of the instruction (such that "finished"=1 in the instruction's associated entry in reorder buffer 76);

Condition 2—No exceptions were encountered in connection with any stage of processing the instruction (such that "exception"=0 in the instruction's associated entry in reorder buffer 76); and Condition 3—Any previously dispatched instruction satisfies Condition 1 and Condition 2.

In response to information in reorder buffer 76, dispatch logic 74 determines a suitable number of additional instructions to be dispatched.

FIG. 5 is a conceptual illustration of floating point rename buffers 38. As shown in FIG. 5, rename buffers 38 include four rename buffers respectively labelled as buffer numbers 0–3. Sequencer unit 18 allocates (or "associates") rename buffer numbers 0–3 to dispatched instructions on a first-in first-out basis and in a rotating manner, such that sequencer unit 18 allocates rename buffer number 0, followed sequentially by rename buffer numbers 1–3, and then rename buffer number 0 again.

Referring to FIG. 5, rename buffer 2 is allocated to store destination operand information for instructions dispatched by dispatch logic 74 (FIG. 2). FIG. 5 shows an allocation pointer 180, a writeback pointer 182, and a completion pointer 184. Processor 10 maintains such pointers for controlling reading from and writing to rename buffers 38. Processor 10 maintains allocation pointer 180 to indicate whether a rename buffer is allocated to a particular instruction. As shown in FIG. 5, allocation pointer 180 points to rename buffer 3, thereby indicating that rename buffer 3 is the next rename buffer available for allocation to an instruction.

Processor 10 further maintains writeback pointer 182 to indicate whether a rename buffer (previously allocated to a particular instruction) is available for reallocation to another instruction. As shown in FIG. 5, writeback pointer 182 points to rename buffer 2, thereby indicating that rename buffer 2 is the next rename buffer from which processor 10 will copy destination operand information (as stored in the rename buffer's "information" field of FIG. 5) to one of FPRs 36 (as specified in the rename buffer's "register number" field of FIG. 5).

Accordingly, processor 10 advances writeback pointer 182 (past a rename buffer previously allocated to a particular instruction) in response to processor 10 copying the result (destination operand information) of the particular instruction from the rename buffer for storage in an architectural register. In this manner, processor 10 reserves an allocated rename buffer to store the result (destination operand information) of the particular instruction until processor 10 copies the result to an architectural register.

Also, processor 10 maintains completion pointer 184 to indicate (for a rename buffer previously allocated to a particular instruction) whether the particular instruction satisfies the following conditions:

Condition 1—The execution unit (to which the instruction is dispatched) finishes execution of the instruction;

Condition 2—No exceptions were encountered in connection with any stage of processing the instruction; and Condition 3—Any previously dispatched instruction satisfies Condition 1 and Condition 2.

As shown in FIG. 5, completion pointer 184 points to rename buffer 2, thereby indicating that rename buffer 2 is the next rename buffer capable of satisfying Conditions 1, 2 and 3. In the illustrative embodiment, processor 10 maintains completion pointer 184 independent of whether the instruction's result is copied from the rename buffer for storage in an architectural register.

Accordingly, "rename entries" can be defined as the rename buffer pointed to by completion pointer 184 and its subsequent rename buffers that precede the rename buffer pointed to by allocation pointer 180. "Writeback entries" can be defined as the rename buffer pointed to by writeback pointer 182 and its subsequent rename buffers that precede the rename buffer pointed to by completion pointer 184. The writeback entries store results of instructions that are "complete" but whose results have not been copied from the rename buffers to architectural registers, as for example due to unavailability of write ports to the architectural registers.

Conceptually, the writeback entries are located between the rename entries and the architectural registers. Advantageously, a result may bypass the writeback entries and be written directly into the architectural registers if a writeback port is available at the completion stage. Moreover, like the rename entries, processor 10 operates the writeback entries to output information to an execution unit in situations where the execution unit executes an instruction specifying an architectural register associated with such information.

FPU 30 is fully IEEE 754-compliant for both single-precision (i.e. 32-bit) and double-precision (i.e. 64-bit) operands. Accordingly, for supporting double-precision operations, each rename buffer's "information" field of FIG. 5 is 64-bits wide. Referring also to FIG. 1, if processor 10 is operating in the Full-power mode, then LSU 28 loads (in response to LSU 28 executing a "load" instruction directed to FPRs 36) 64 bits of information from data cache 16 into a single rename buffer's "information" field (of rename buffers 38) during a single cycle (i.e. 64 bits of information per cycle) of processor 10. In this manner, as an example, since data cache 16 is a four-way set-associative cache, at least 256 sense amplifiers (64 bits/way×4 ways×1 sense amplifier/bit) of data cache 16 are active during such a single cycle of processor 10. Activation of these sense amplifiers contributes to the average power consumption of processor 10.

By comparison, if processor 10 is operating in the Special power mode, then LSU 28 loads (in response to LSU 28 executing a "load" instruction directed to FPRs 36) 64 bits of information from data cache 16 into a single rename buffer's "information" field (of rename buffers 38) during two cycles (i.e. 32 bits of information per cycle) of processor 10. In this manner, as an example, 128 sense amplifiers (32 bits/way×4 ways×1 sense amplifier/bit) of data cache 16 are active (while the other 128 sense amplifiers of data cache 16 are disabled) during each of these two cycles of processor 10. Advantageously, by activating only 128 sense amplifiers (in the Special mode) instead of 256 sense amplifiers (in the Full-power mode), the average power consumption of processor 10 is reduced, because only ½ as many of these sense amplifiers are activated per cycle of processor 10.

Additional reductions are achieved if processor 10 enters the Special "power saving" mode in response to the software event, because in that situation processor 10 reduces the number of "ways" within instruction cache 14 and data cache 16 as discussed further hereinbelow in connection with FIG. 6. For example, if processor 10 reduces the number of "ways" within data cache 16 to two-way instead of four-way in response to the software event, then 64 sense amplifiers (32 bits/way×2 ways×1 sense amplifier/bit) of data cache 16 are active (while the other 192 sense amplifiers of data cache 16 are disabled) during each of the aforementioned two cycles of processor 10 while processor 10 is operating in the Special power mode. Advantageously, by activating only 64 sense amplifiers (if processor 10 enters the Special "power saving" mode in response to the software event) instead of 256 sense amplifiers (in the Full-power mode), the average power consumption of processor 10 is reduced, because only ¼ as many of these sense amplifiers are activated per cycle of processor 10.

Figure 6:
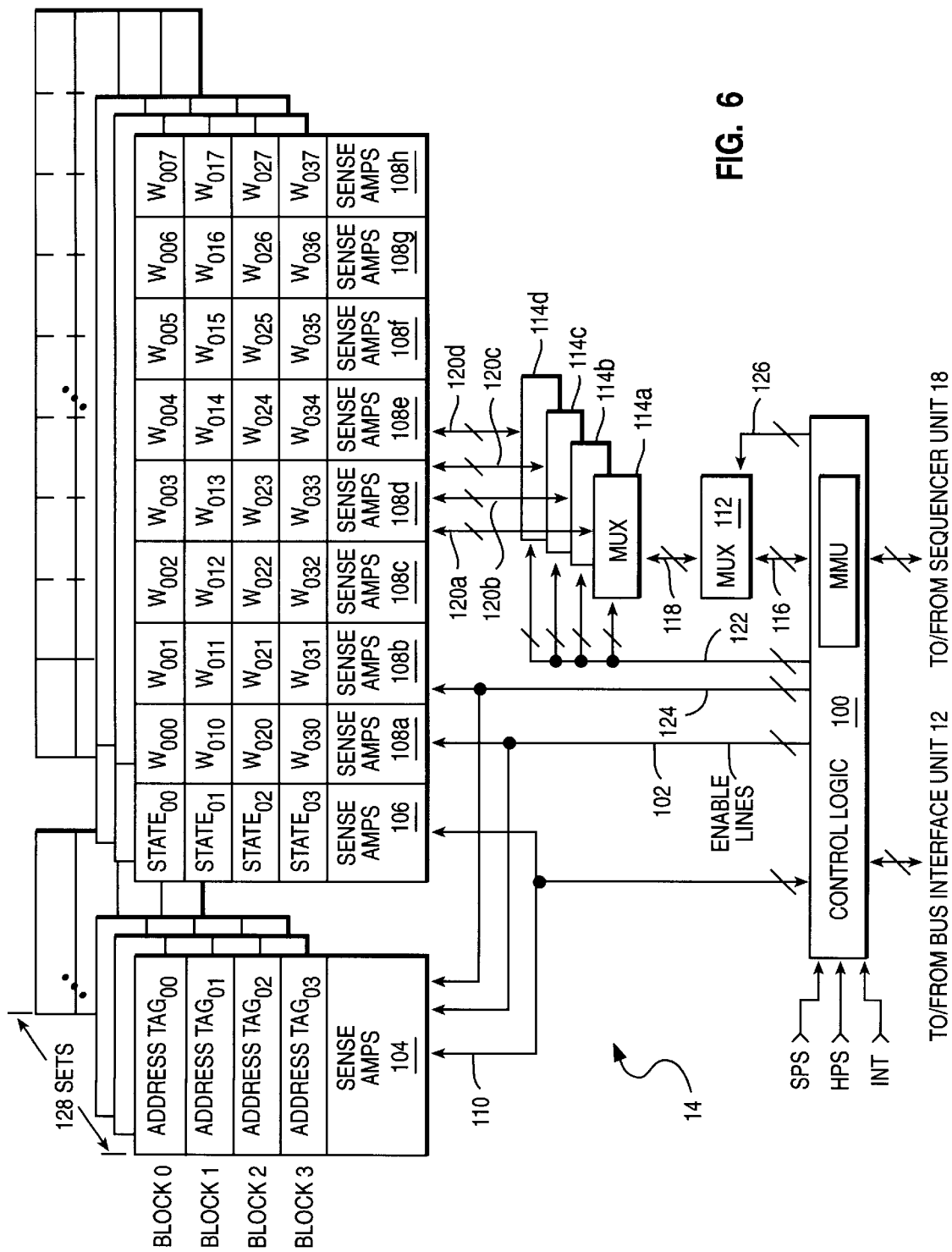
FIG. 6 is a block diagram of an instruction cache of the processor of FIG. 1.

FIG. 6 is a block diagram of instruction cache 14. Instruction cache 14 of FIG. 6 is likewise representative of data cache 16. Each of instruction cache 14 and data cache 16 is a 16-kilobyte, four-"way" set-associative cache. Instruction cache 14 and data cache 16 are addressed in response to physical (i.e. "real") addresses.

Accordingly, FIG. 6 shows control logic 100 which includes a memory management unit ("MMu") for translating effective addresses to associated physical addresses. For example, effective addresses are received from fetch logic 71 (FIG. 2) of sequencer unit 18. In the illustrative embodiment, an effective address's bits $2^0$ through $2^{11}$ are unchanged by translation into its associated physical address, so the effective address's bits $2^0$ through $2^{11}$ have the same digital logic values as the associated physical address's bits $2^0$ through $2^{11}$.

Each of instruction cache 14 and data cache 16 is logically arranged into 128 congruence classes (i.e. sets) as shown in FIG. 6. As an example, for instruction cache 14, each set has a respective preassigned associated group of four lines (i.e. four "ways", Blocks 0–3) within instruction cache 14. Each line is able to store a respective address tag, respective state bits (e.g. including a "valid" bit), and a respective group of eight words of information. Each word has 4 bytes (i.e. 32 bits).

Thus, Block 3 of Set 0 is able to store an Address Tag$_{30}$, state bits State$_{30}$, and words W$_{030}$ through W$_{037}$. Likewise, each Block y of Set x is able to store an Address Tag$_{xy}$, state bits State$_{xy}$, and words W$_{xy0}$ through W$_{xy7}$, where x is a variable integer set number ranging from 0 through 127, and where y is a variable integer block number ranging from 0 through 3.

A set is specified by a physical address's bits $2^5$ through $2^{11}$. Thus, each set includes multiple addresses, all of which share the same seven physical address bits $2^5$ through $2^{11}$. Accordingly, at any single moment, instruction cache 14 stores information for up to four physical addresses belonging to a particular Set x, as specified by Address Tag$_{x0}$ through Address Tag$_{x3}$ stored in Set x's associated group of four lines within instruction cache 14.

For example, (a) in Block 0 of Set 0, instruction cache 14 can store Address Tag$_{00}$ including a first address's bits $2^{12}$ through $2^{31}$, (b) in Block 1 of Set 0, instruction cache 14 can store Address Tag$_{01}$, including a second address's bits $2^{12}$ through $2^{31}$, (c) in Block 2 of Set 0, instruction cache 14 can store Address Tag$_{02}$ including a third address's bits $2^{12}$ through $2^{31}$, and (d) in Block 3 of Set 0, instruction cache 14 can store Address Tag$_{03}$ including a fourth address's bits $2^{12}$ through $2^{31}$. Thus, each Address Tag$_{xy}$ has 20 bits.

FIG. 7 is a schematic electrical circuit diagram of sense amplification circuitry, indicated generally at 121, of instruction cache 14 of FIG. 6. Sense amplification circuitry 121 is a representative sense amp of sense amps 104, 106 and 108a–h of FIG. 6. Accordingly, since each Address Tag$_{xy}$ has 20 bits, sense amps 104 includes 80 sense amps (20 sense amps multiplied by 4 Blocks 0–3) each substantially identical to circuitry 121.

Similarly, since each word W$_{xyz}$ (where z is an integer word number from 0 through 7) has 32 bits, each of sense amps 108a–h includes a respective group of 128 sense amps (32 sense amps multiplied by 4 Blocks 0–3) each substantially identical to circuitry 121, so that sense amps 108a–h include a combined total of 1024 sense amps (128 sense amps multiplied by 8 Words 0–7). Likewise, the number of sense amps in sense amps 106 is equal to four times the number of bits per State$_{xy}$, and each of these sense amps is substantially identical to circuitry 121.

Each 20-bit Address Tag$_{xy}$ includes a respective group of 20 dynamic random access memory ("DRAM") cells, each DRAM cell being able to store a respective single bit of digital information. Similarly, each 32-bit word W$_{xyz}$ includes a respective group of 32 DRAM cells, each DRAM cell being able to store a respective single bit of digital information. Likewise, the number of DRAM cells in each State$_{xy}$ is equal to the number of bits per State$_{xy}$.

The 80 sense amps of sense amps 104 are organized so that (1) each of the 128 sets of 20 DRAM cells denoted as Address Tag$_{x0}$ (where x is the set number) is coupled to a first group of 20 sense amps (of sense amps 104), respectively, (2) each of the 128 sets of 20 DRAM cells denoted as Address Tag$_{x1}$ is coupled to a second group of 20 sense amps (of sense amps 104), respectively, (3) each of the 128 sets of 20 DRAM cells denoted as Address Tag$_{x2}$ is coupled to a third group of 20 sense amps (of sense amps 104), respectively, and (4) each of the 128 sets of 20 DRAM cells denoted as Address Tag$_{x3}$ is coupled to a fourth group of 20 sense amps (of sense amps 104), respectively.

Accordingly, each sense amp (of sense amps 104) is coupled to a respective family of 128 DRAM cells which store digital information for bit $2^q$ of Address Tag$_{xy}$, where: (a) q is a constant (i.e. common to all DRAM cells of the family) bit number from 0 through 19, (b) x is a variable (i.e. different for all DRAM cells of the family) set number from 0 through 127, and (c) y is a constant block number from 0 through 3.

As shown in FIG. 7, each sense amp (circuitry 121) has an ENABLE line. With reference to FIG. 6, enable lines 102 include a total of 4 address tag ENABLE lines (i.e. 4 blocks * 1 address tag ENABLE line per block). Each such address tag ENABLE line is connected from control logic 100 to a respective one of the four groups of sense amps 104, where the respective group is coupled to a family of DRAM cells which store digital information for Address Tag$_{xy}$, where (a) x is a variable set number from 0 through 127, and (b) y is a constant block number from 0 through 3.

The 1024 sense amps of sense amps 108a–h are organized so that (1) each of the 128 sets of 256 DRAM cells denoted as W$_{x0z}$ is coupled through a first group of 256 sense amps (of sense amps 108a–h), respectively, to a multiplexer 114a via a bus 120a, (2) each of the 128 sets of 256 DRAM cells denoted as W$_{x1z}$ is coupled through a second group of 256 sense amps (of sense amps 108a–h), respectively, to a multiplexer 114b via a bus 120b, (3) each of the 128 sets of 256 DRAM cells denoted as W$_{x2z}$ is coupled through a third group of 256 sense amps (of sense amps 108a–h), respectively, to a multiplexer 114c via a bus 120c, and (4) each of the 128 sets of 256 DRAM cells denoted as W$_{x3z}$ is coupled through a fourth group of 256 sense amps (of sense amps 108a–h), respectively, to a multiplexer 114d via a bus 120d.

Accordingly, each sense amp (of sense amps 108a–h) is coupled to a respective family of 128 DRAM cells which store digital information for bit $2^q$ of words W$_{xyz}$, where: (a) q is a constant bit number from 0 through 31, (b) x is a variable set number from 0 through 127, (c) y is a constant block number from 0 through 3, and (d) s is a constant word number from 0 through 7.

Enable lines 102 include a total of 32 word ENABLE lines (i.e. 4 blocks * 8 words/block * 1 word ENABLE line per word). Each such word ENABLE line is connected from control logic 100 to a respective subgroup of the four groups of sense amps 108a–h, where the respective subgroup is coupled to a family of DRAM cells which store digital information for words W$_{xyz}$, where (a) x is a variable set number from 0 through 127, (b) y is a constant block number from 0 through 3, and (c) z is a constant word number from 0 through 7.

Likewise, sense amps 106 are organized so that (1) each of the 128 sets of DRAM cells denoted as State$_{x0}$ (where x is the set number) is coupled to a first group of sense amps (of sense amps 106), (2) each of the 128 sets of DRAM cells denoted as State$_{x1}$ is coupled to a second group of sense amps (of sense amps 106), (3) each of the 128 sets of 20 DRAM cells denoted as State$_{x2}$ is coupled to a third group of sense amps (of sense amps 106), and (4) each of the 128 sets of DRAM cells denoted as State$_{x3}$ is coupled to a fourth group of sense amps (of sense amps 106).

Accordingly, each sense amp (of sense amps 106) is coupled to a respective family of 128 DRAM cells which store digital information for bit $2^q$ of State$_{x2}$ where: (a) q is a constant bit number, (b) x is a variable set number from 0 through 127, and (c) y is a constant block number from 0 through 3.

Enable lines 102 include a total of 4 state ENABLE lines (i.e. 4 blocks * 1 state ENABLE line per block). Each such state ENABLE line is connected from control logic 100 to a respective one of the four groups of sense amps 106, where the respective group is coupled to a family of DRAM cells which store digital information for State$_{xy}$, where (a) x is a variable set number from 0 through 127, and (b) y is a constant block number from 0 through 3.

With reference to FIG. 7, each sense amp (circuitry 121) inputs a differential voltage through lines D and $\overline{D}$ from one of its 128 coupled DRAM cells, where the one DRAM cell is selected in response to logic states of control lines 124 output from control logic 100 according to the set number (i.e. according to an address's bits $2^5$ through $2^{11}$ as discussed hereinabove). If ENABLE has a logic 1 state, then circuitry 121 is activated; otherwise, circuitry 121 is not activated. If circuitry 121 is not activated, processor 10 consumes less power, and an output node OUT has a high impedance state. If D has a voltage greater than $\overline{D}$ while circuitry 121 is activated, then OUT has a voltage substantially equal to Vdd (i.e. a logic 1 state). By comparison, if D has a voltage less than $\overline{D}$ while circuitry 121 is activated, then OUT has a voltage substantially equal to GND (i.e. a logic 0 state).

Through a bus 110, address tag information is transferred between control logic 100 and Address Tag$_{xy}$, and state information is transferred between control logic 100 and State$_{xy}$. Through buses 116, 118 and 120a–d, instruction information (or data information in the case of data cache 16) is transferred between control logic 100 and W$_{xyz}$.

In an example instruction fetch operation, control logic 100 receives an effective address from sequencer unit 18. Control logic 100 determines a particular Set x in response to the received effective address's bits $2^5$ through $2^{11}$ (as discussed hereinabove), and control logic 100 inputs information from Blocks 0–3 of Set x. More particularly, through bus 110, control logic 100 reads the four address tags, Address Tag$_{x0}$, Address Tag$_{x1}$, Address Tag$_{x2}$ and Address Tag$_{x3}$, and their respectively associated four states, State$_0$, State$_{x1}$, State$_{x2}$ and State$_{x3}$.

Further, control logic 100 outputs the received effective address's bits $2^3$ and $2^4$ to multiplexers 114a–d through control lines 122. In response to the logic states of control lines 122, multiplexer 114a outputs a selected double-word from Block 0 of Set x to bus 118. For example, the selected double-word is from either (a) the DRAM cells denoted as W$_{x00}$ and W$_{x01}$, (b) the DRAM cells denoted as W$_{x02}$ and W$_{x03}$, (c) the DRAM cells denoted as W$_{x04}$ and W$_{x05}$, or (d) the DRAM cells denoted as W$_{x06}$ and W$_{x07}$.

Likewise, in response to the logic states of control lines 122, multiplexer 114b outputs a selected double-word from Block 1 of Set x to bus 118, multiplexer 114c outputs a selected double-word from Block 2 of Set x to bus 118, and multiplexer 114d outputs a selected double-word from Block 3 of Set x to bus 118. Through bus 118, multiplexer 112 receives all four double-words from multiplexers 114a–d.

MMU of control logic 100 translates the received effective address into a specific physical address. Control logic 100 compares the specific physical address's bits $2^{12}$ through $2^{31}$ against any valid Address Tag$_{xy}$ from bus 110. Validity of an Address Tag$_{xy}$ is indicated by a digital logic value of the "valid" bit in State$_{xy}$ associated with Address Tag$_x$. In response to such a comparison, if the specific physical address's bits $2^{12}$ through $2^{31}$ are a match with any valid Address Tag$_{xy}$, then control logic 100 outputs suitable control signals to a multiplexer 112 through control lines 126, so that multiplexer 112 outputs (to control logic 100 through bus 116) either (a) the double-word from multiplexer 114a if the match is with Address Tag$_{x0}$, (b) the double-word from multiplexer 114b if the match is with Address Tag$_{x1}$, (c) the double-word from multiplexer 114c if the match is with Address Tag$_{x2}$ or (d) the double-word from multiplexer 114d if the match is with Address Tag$_{x3}$.

Accordingly, control logic 100 inputs a double-word from multiplexer 112. If processor 10 is operating in the Full-power mode, then control logic 100 outputs the double-word from multiplexer 112 to sequencer unit 18 as part of the example instruction fetch operation.

By comparison, if processor 10 is operating in the Special power mode, then control logic 100 outputs only a single word (i.e. half of the double-word) from multiplexer 112 to sequencer unit 18. Control logic 100 selects the single word in response to the effective address's bit $2^2$. This is because, if processor 10 is operating in the Special power mode, then instruction buffer 70 (FIG. 3) is able to input only a single 32-bit instruction (instead of up to two 32-bit instructions) from instruction cache 14 through 64-bit bus 50 during a single cycle of processor 10.

In the Special power mode, control logic 100 outputs suitable signals on ENABLE lines 102, so that only selected subgroups of sense amps 108a–h are activated while non-selected subgroups of sense amps 108a–h are disabled. The selected subgroups are the ones coupled to DRAM cells which store digital information for words W$_{xyz}$, where (a) x is a variable set number from 0 through 127, (b) y is a variable block number from 0 through 3, and (c) z is a constant word number from 0 through 7 which is selected in response to the effective address's bits $2^2$ through $2^4$. In this manner, processor 10 activates fewer (relative to the Full-power mode) sense amplifiers of instruction cache 14 per cycle of processor 10, so the average power consumption of instruction cache 14 (and hence of processor 10) is reduced.

Additional reductions are achieved if processor 10 enters the Special "power saving" mode in response to the software event (i.e. SPS has a logic 1 state), because in that situation control logic 100 reduces the number of "ways" within instruction cache 14 to two-way instead of four-way. Accordingly, while processor 10 operates in the Special "power saving" mode, control logic 100 operates in a manner which ensures that Address Tag$_{x2}$ and Address Tag$_{x3}$ are not valid (as indicated by digital logic values of "valid" bits in State$_{x2}$ and State$_{x3}$, respectively) and (b) only Address Tag$_{x0}$ and Address Tag$_{x1}$ are allowed to be valid (as indicated by digital logic values of "valid" bits in State$_{x0}$ and State$_{x1}$, respectively).

Accordingly, for an instruction fetch operation in that situation, 64 sense amplifiers (1 word/way×4 bytes/word×8 bits/byte×2 ways×1 sense amplifier/bit) are activated instead of 256 sense amplifiers (2words/way×4 bytes/word×8 bits/byte×4 ways×1 sense amplifier/bit), as discussed further hereinabove in connection with FIGS. 2 and 3. Advantageously, this significantly reduces the average power consumption of instruction cache 14 (and hence of processor 10.

Likewise, if processor 10 enters the Special "power saving" mode in response to the software event, processor 10 reduces the number of "ways" within data cache 16 to two-way instead of four-way. Accordingly, for an LSU 28 floating point load operation in that situation, 64 sense amplifiers (1 word/way×4 bytes/word×8 bits/byte×2 ways×1 sense amplifier/bit) are activated instead of 256 sense amplifiers (2 words/way×4 bytes/word×8 bits/byte×4 ways×1 sense amplifier/bit), as discussed further hereinabove in connection with FIG. 5. Advantageously, this significantly reduces the average power consumption of data cache 16 (and hence of processor 10).

The software event occurs at a moment when SPS transitions from a logic 0 state to a logic 1 state. SPS transitions to the logic 1 state in response to CFXU 26 executing a first MTSPR instruction directed to a predetermined bit of a "HID0" register of SPRs 40. The first MTSPR instruction specifies the logic 1 state of SPS.

Immediately before the first MTSPR instruction, it is helpful (in order to reduce complexity of circuitry within processor 10) for the software to specify a "Synchronize" ("SYNC") instruction, followed by an "Instruction Synchronize" ("ISYNC") instruction. Immediately following the first MTSPR instruction, it is helpful for the software to specify another ISYNC instruction.

As just discussed hereinabove, if processor 10 enters the Special "power saving" mode in response to the software event (i.e. SPS has a logic 1 state), processor 10 reduces the number of "ways" within instruction cache 14 and data cache 16 to two-way instead of four-way. Accordingly, immediately before the SYNC instruction that precedes the first MTSPR instruction, it is important for the software to specify "Data Cache Block Flush" ("DCBF") and "Instruction Cache Block Invalidate" ("ICBI") instructions.

Similarly, SPS transitions to a logic 0 state in response to CFXU 26 executing a second MTSPR instruction directed to the predetermined bit of the "HID0" register of SPRs 40. The second MTSPR instruction specifies the logic 0 state of SPS. Immediately before the second MTSPR instruction, it is helpful for the software to specify a SYNC instruction, followed by an ISYNC instruction. Immediately following the second MTSPR instruction, it is helpful for the software to specify another ISYNC instruction.

The DCBF instruction specifies an effective address. In response to the DCBF instruction, if any line within data cache 16 stores information (e.g. data) at the effective address, then processor 10 invalidates the line by clearing the line's "valid" bit in State$_{xy}$. Further in response to the DCBF instruction, if the invalidated line stores information which has been modified by processor 10 relative to an original version of the information stored within memory 39 (FIG. 1) at the same physical address (translated in response to the effective address), then processor 10 updates memory 39 by copying the modified information from data cache 16 to the same physical address within memory 39. Before transitioning SPS to a logic 1 state, it is important for the software to specify enough DCBF instructions to ensure that all lines are invalidated within Blocks 2 and 3 of all 128 sets within data cache 16.

The ICBI instruction specifies an effective address. In response to the ICBI instruction, if any line within instruction cache 14 stores information (e.g. instructions) at the effective address, then processor 10 invalidates the line by clearing the line's "valid" bit in State$_{xy}$. Before transitioning SPS to a logic 1 state, it is important for the software to specify enough ICBI instructions to ensure that all lines are invalidated within Blocks 2 and 3 of all 128 sets within instruction cache 14.

The SYNC instruction provides an ordering function for the effects of all instructions executed by processor 10. In executing the SYNC instruction, before processor 10 executes any subsequent instructions (i.e. instructions following the SYNC instruction within the programmed sequence of instructions for execution), processor ensures that all prior instructions (except "touch load" operations and instruction fetches) have completed, at least to the point where such prior instructions (i.e. instructions preceding the SYNC instruction within a programmed sequence of instructions for execution) are no longer able to cause an exception.

When processor 10 completes the SYNC instruction, processor 10 will have performed (with respect to all other mechanisms that access memory 39) all external accesses initiated by processor 10 prior to the SYNC instruction. Further, processor 10 will have completed all its load and store cache/bus activities initiated in response to prior instructions. Processor 10 delays completion of the SYNC instruction until all prior "Data Cache Block Touch" ("DCBT") and "Data Cache Block Touch for Store" ("DCBTST") instructions have completed, at least through address translation, but without regard to whether such DCBT and DCBTST instructions have completed on system bus 11. The SYNC, DCBT and DCBTST instructions are more completely described in the *PowerPC 603e RISC Microprocessor User's Manual*, identified hereinabove.

In response to the ISYNC instruction, processor 10 waits until it is able to complete all prior instructions (i.e. instructions preceding the ISYNC instruction within the programmed sequence of instructions for execution). Then, processor 10 discards any fetched instructions, so that future instructions are fetched (or refetched) and executed in the context established by the prior instructions. Execution of the ISYNC instruction by processor 10 has no effect on other processors or their caches.

In executing the ISYNC instruction, processor 10 achieves refetch serialization. In this manner, before processor 10 executes any subsequent instructions (i.e. instructions following the ISYNC instruction within the programmed sequence of instructions for execution), processor 10 ensures that (a) all prior instructions have completed, at least to the point where such prior instructions are no longer able to cause an exception, and (b) all prior store operations have completed, at least through address translation. These subsequent instructions are subject to all effects of the prior instructions. The ISYNC instruction is context synchronizing.

The hardware event occurs at a moment when HPS transitions from a logic 0 state to a logic 1 state. In response to HPS transitioning from a logic 0 state to a logic 1 state, processor 10 performs the following enumerated actions.

1. Sequencer unit 18 (FIG. 1) aborts any pending instructions in instruction buffer 70 (FIG. 3) which have not already been dispatched to execution units of processor 10.
2. Processor 10 aborts any pending instructions in the execution units (branch unit 20, FXU 22, CFXU 26, LSU 28 and FPU 30), so that such pending instructions are not executed. In that regard, LSU 28 (FIG. 1) aborts any pending store instructions which have not already resulted in storage of information in data cache 16. For example, in the illustrative embodiment, LSU 28 includes a store queue. Accordingly, LSU 28 aborts any pending store requests in the store queue, so that such pending store requests are not performed.
3. Processor 10 invalidates all entries in rename buffers 34 and 38 (FIG. 1). For example, processor 10 moves writeback pointer 182 (FIG. 5) and completion pointer 184, so that writeback pointer 182 and completion pointer 184 point to the same rename buffer entry as allocation pointer 180.
4. Sequencer unit 18 (FIG. 2) saves the address of the instruction pointed to by completion pointer 175 (FIG. 4) of reorder buffer 76. Then, processor 10 invalidates all entries in reorder buffer 76 by moving completion pointer 175, so that completion pointer 175 points to the same reorder buffer entry as allocation pointer 173.

After processor 10 performs the foregoing enumerated actions, fetch logic 71 (FIG. 2) resumes fetching instructions, beginning at the address saved by sequencer unit 18 as discussed hereinabove in the immediately preceding paragraph (i.e. in enumerated action 4 hereinabove).

In an alternative embodiment, processor 10 reduces the number of "ways" within instruction cache 14 and data cache 16 to two-way instead of four-way anytime processor 10 enters the Special "power saving" mode, without regard to whether processor 10 enters the Special "power saving" mode in response to the software event or the hardware event. In such an alternative embodiment, in response to BPS transitioning from a logic 0 state to a logic 1 state:

(1) control logic 100 (FIG. 6) ensures that all lines within Block 2 and Block 3 of all 128 sets within instruction cache 14 are invalidated, such that the "valid" bits in State$_{xy}$ are cleared;

(2) likewise the control logic of data cache 16 ensures that all lines within Block 2 and Block 3 of all 128 sets within data cache 16 are invalidated; and (3) if any such invalidated line within data cache 16 stores information which has been modified by processor 10 relative to an original version of the information stored within memory 39 (FIG. 1) at the same physical address (translated in response to the effective address), then processor 10 updates memory 39 by copying the modified information from data cache 16 to the same physical address within memory 39.

Control logic 100 implements a least recently used ("LRU") replacement policy for storing new information within instruction cache 14. In that regard, data cache 16 is substantially identical to instruction cache 14. Relative to instruction cache 14, data cache 16 additionally supports processor 10 write operations to data cache 16. Processor 10 is able to perform such write operations on a byte-by-byte, half-word, word, or double-word basis. Moreover, processor 10 is able to perform a full read-modify-write operation to data cache 16 in a single cycle of processor 10. Data cache 16 selectively operates in either write-back or write-through mode, and it implements control of cacheability, write policy, and memory coherency on a page-by-page and line-by-line basis.

Although an illustrative embodiment and its advantages have been described in detail hereinabove, they have been described as example and not as limitation. Various changes, substitutions and alterations can be made in the illustrative embodiment without departing from the breadth, scope and spirit of the present inventions.

What is claimed is:

1. A method, comprising:

operating dispatch unit of a data processor at a first clock rate;

selecting between a first and a second power mode for said dispatch unit responsive to a power control signal, wherein;

while operating said dispatch unit in a first power mode, dispatching up to N number of instructions per cycle of the dispatch unit at said first clock rate to execution unit for execution, wherein N is an integer number and N>1; and while operating said dispatch unit in a second power mode, dispatching up to M number of instructions per cycle of the dispatch unit at said first clock rate to said execution unit for execution, wherein M is an integer number and 0<M<N.

2. The method of claim 1 wherein said first power mode is a full power mode, and said second power mode is a low power mode.

3. The method of claim 1 wherein said power control signal is generated in response to a software event.

4. The method of claim 1 wherein said power control signal is generated in response to a hardware event.

5. The method of claim 4 wherein said hardware event occurs when a temperature of a selected processor circuit exceeds a threshold temperature.

6. The method of claim 5 wherein said threshold temperature is a maximum safe temperature of said said selected processor circuit operating in said first power mode.

7. Circuitry of a data processor, comprising:

means for operating dispatch unit in said processor at a first clock rate;

means responsive to a power control signal for said dispatch unit to dispatch up to N number of instructions to execution unit for execution, per cycle of said dispatch unit at said first clock rate, while dispatch unit operates in a first power mode, wherein N is an integer number and N>1; and means responsive to a power control signal for said dispatch unit to dispatch up to M number of instructions to said execution unit for execution, per cycle of said dispatch unit at said first clock rate, while said dispatch unit operates in a second power mode, wherein M is an integer number and 0<M<N.

8. The circuitry of claim 7 wherein said first power mode is a full power mode, and said second power mode is a low power mode.

9. The circuitry of claim 7 wherein said power control signal is generated in response to a software event.

10. The circuitry of claim 7 wherein said power control signal is generated in response to a hardware event.

11. The circuitry of claim 10 wherein said hardware event occurs when a temperature of a selected processor circuit exceeds a threshold temperature.

12. The circuitry of claim 11 wherein said threshold temperature is a maximum safe temperature of said selected process circuit operating in said first power mode.

* * * * *